US009253185B2

(12) United States Patent
Alaranta et al.

(10) Patent No.: US 9,253,185 B2
(45) Date of Patent: Feb. 2, 2016

(54) CLOUD CENTRIC APPLICATION TRUST VALIDATION

(71) Applicant: Nokia Corporation, Espoo (FI)

(72) Inventors: Anssi Alaranta, Medford, MA (US); Zahid N. Ahmed, Westborough, MA (US); Karthik Muthukrishnan, Helsinki (FI); Mike Beauford, Morton Grove, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/101,557

(22) Filed: Dec. 10, 2013

(65) Prior Publication Data

US 2014/0181517 A1    Jun. 26, 2014

Related U.S. Application Data

(60) Provisional application No. 61/736,197, filed on Dec. 12, 2012.

(51) Int. Cl.
*H04L 29/06* (2006.01)
*G06F 21/57* (2013.01)
*G06F 21/44* (2013.01)
*G06F 21/51* (2013.01)

(52) U.S. Cl.
CPC ............ *H04L 63/0823* (2013.01); *G06F 21/44* (2013.01); *G06F 21/51* (2013.01); *G06F 21/575* (2013.01); *H04L 63/062* (2013.01)

(58) Field of Classification Search
None
See application file for complete search history.

(56) References Cited

U.S. PATENT DOCUMENTS

| 7,207,039 | B2 * | 4/2007 | Komarla et al. | 717/178 |
| 8,291,480 | B2 * | 10/2012 | de Cesare | G06F 21/00 713/182 |
| 8,312,518 | B1 * | 11/2012 | Ezell et al. | 726/6 |
| 8,533,796 | B1 * | 9/2013 | Shenoy et al. | 726/6 |
| 8,694,777 | B2 * | 4/2014 | Goodman et al. | 713/168 |
| 8,826,013 | B1 * | 9/2014 | Kodukula et al. | 713/165 |

(Continued)

FOREIGN PATENT DOCUMENTS

GB    2489563 A    10/2012

OTHER PUBLICATIONS

"AWS Security Token Service Using Temporary Security Credentials APU Version Jun. 15, 2011", pp. 1-59, 2011.

(Continued)

*Primary Examiner* — Andrew Nalven
*Assistant Examiner* — Christopher Ruprecht
(74) *Attorney, Agent, or Firm* — Harrington & Smith

(57) ABSTRACT

In accordance with the exemplary embodiments of the invention there is at least a method and an apparatus to perform the method of sending towards a key management device associated with an application service provider for an application, a key request for the application being booted in the cloud network; and in response to the key request, receiving an application specific key for the application, where the key is based on multiple factors associated with the application server. Further, there is at least a method and an apparatus to perform the method of receiving a key request from an application server of a cloud network for the application being booted in the cloud network; in response to the key request, authenticating the request using multiple attributes associated with the application server; and sending an application specific key for the application towards the application server.

20 Claims, 14 Drawing Sheets

(56) References Cited

U.S. PATENT DOCUMENTS

| | | | |
|---|---|---|---|
| 2007/0234041 A1* | 10/2007 | Lakshmeshwar | H04L 9/3271 713/156 |
| 2010/0198730 A1* | 8/2010 | Ahmed et al. | 705/50 |
| 2010/0266132 A1* | 10/2010 | Bablani | H04L 9/0894 380/286 |
| 2011/0289315 A1* | 11/2011 | Laitinen | G06F 21/575 713/156 |
| 2011/0302400 A1* | 12/2011 | Maino et al. | 713/2 |
| 2011/0307947 A1 | 12/2011 | Kariv et al. | 726/9 |
| 2011/0320802 A1* | 12/2011 | Wang | H04L 9/0822 713/2 |
| 2012/0088584 A1 | 4/2012 | Mamtani et al. | 463/42 |
| 2012/0151568 A1* | 6/2012 | Pieczul et al. | 726/8 |
| 2012/0179904 A1* | 7/2012 | Dunn et al. | 713/155 |
| 2012/0216244 A1 | 8/2012 | Kumar et al. | 726/1 |
| 2012/0240211 A1* | 9/2012 | Counterman | H04L 9/321 726/9 |
| 2012/0266231 A1* | 10/2012 | Spiers | H04L 63/0218 726/12 |
| 2012/0324556 A1* | 12/2012 | Yefimov et al. | 726/7 |
| 2013/0086210 A1* | 4/2013 | Yiu et al. | 709/217 |
| 2013/0117564 A1* | 5/2013 | Chang et al. | 713/168 |
| 2013/0139235 A1* | 5/2013 | Counterman | H04L 63/061 726/7 |
| 2013/0149996 A1* | 6/2013 | King | H04W 12/08 455/411 |
| 2014/0019753 A1* | 1/2014 | Lowry | G06F 21/62 713/155 |
| 2014/0040993 A1* | 2/2014 | Lorenzo et al. | 726/4 |
| 2014/0050317 A1* | 2/2014 | Sabin | 380/44 |
| 2014/0082715 A1* | 3/2014 | Grajek et al. | 726/8 |
| 2014/0105103 A1* | 4/2014 | Nethi et al. | 370/328 |
| 2014/0359259 A1* | 12/2014 | Ali et al. | 713/1 |
| 2015/0163669 A1* | 6/2015 | Holtmanns | H04L 9/0869 726/6 |

OTHER PUBLICATIONS

3GPP TS 36.300 V11.3.0 (Sep. 2012), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), (205 pages).

* cited by examiner

KEY MANAGEMENT SYSTEM MODULE SUPPORT

- CENTRALIZED KEY MANAGEMENT SYSTEM THAT SUPPORTS VIA HSM ABILITY TO SECURELY STORE, MANAGE, ACCESS DATA ENCRYPTION KEYS AND MASTER KEYS
- KEY ALGORITHM SUPPORT TO INCLUDE ALL STANDARDS: AES SYMMETRIC KEYS, RSA/DSA PUBLIC KEY ENCRYPTION, etc.
- FULL KEY MANAGEMENT LIFE-CYCLE SUPPORT
- CAPABILITY TO CREATE KEYS
- CAPABILITY TO UPDATE/ROTATE KEYS KEY ROTATION CAN USE ROTATION POLICIES ON A PER-APPLICATION BASIS
- CAPABILITY TO REVOKE KEYS
- CAPABILITY TO DELETE KEYS
- SUPPORT FOR KEY ROTATION BASED ON ROTATION POLICIES ON PER-APPLICATION BASIS
- ALLOWING VIA A MANAGEMENT INTERFACE ON A PER-APPLICATION BASIS POLICY DEFINITION FOR COMPLETE KEY LIFECYCLE MANAGEMENT SUCH THAT APPLICATION PROVIDER CAN LOCALLY ENFORCE A BROAD RANGE OF POLICIES FOR AUTHORIZATIONS, ROTATIONS, GROUPINGS, EXPIRATIONS, REVOCATIONS, RETRIEVAL LIMITS, etc. TO COMPLY WITH BUSINESS POLICIES AND VARIOUS REGIONAL COMPLIANCE REQUIREMENTS
- ALLOW ADMINS TO SET POLICIES FOR ACCESSING KEYS, AND SUPPORTS COMPLETE AUDIT TRAIL OF KEY ACCESSES INITIATED BY SERVER ADMINS AS WELL ALL CRITICAL KEY ASSETS ACCESSED BY CALLING CLIENT APPLICATIONS
- SUPPORT MULTI-SITE DR/HA, HIGH PERFORMANCE AND SCALABILITY REQUIREMENTS FOR CONCURRENT, MULTI-REGION/DISTRIBUTED CLIENT ACCESS
- SUPPORT HOT SWAPABLE AUTO CLUSTERING KEY MANAGEMENT SERVERS, (e.g., ACTIVE-ACTIVE DEPLOYMENT OF KM/HSM)
- SUPPORT FOR LINUX SYSTEM (CentOS, REDHAT)
- SUPPORT HARDWARE BASED DEPLOYMENT ON ANY STANDARD COMMODITY SERVER
- FIPS 2/3 COMPLIANCE
- KIPS V1 PROTOCOL SUPPORT
- PROPOGATE CRITICAL ALERTS
- SUPPORT MULTI-LANGUAGE INTEGRATION SUPPORT VIA REST API INTERFACE AND BINDING CLIENT SDKs (MINIMAL: JAVA, C, C++, C#, PHP, PYTHON)

FIG.4

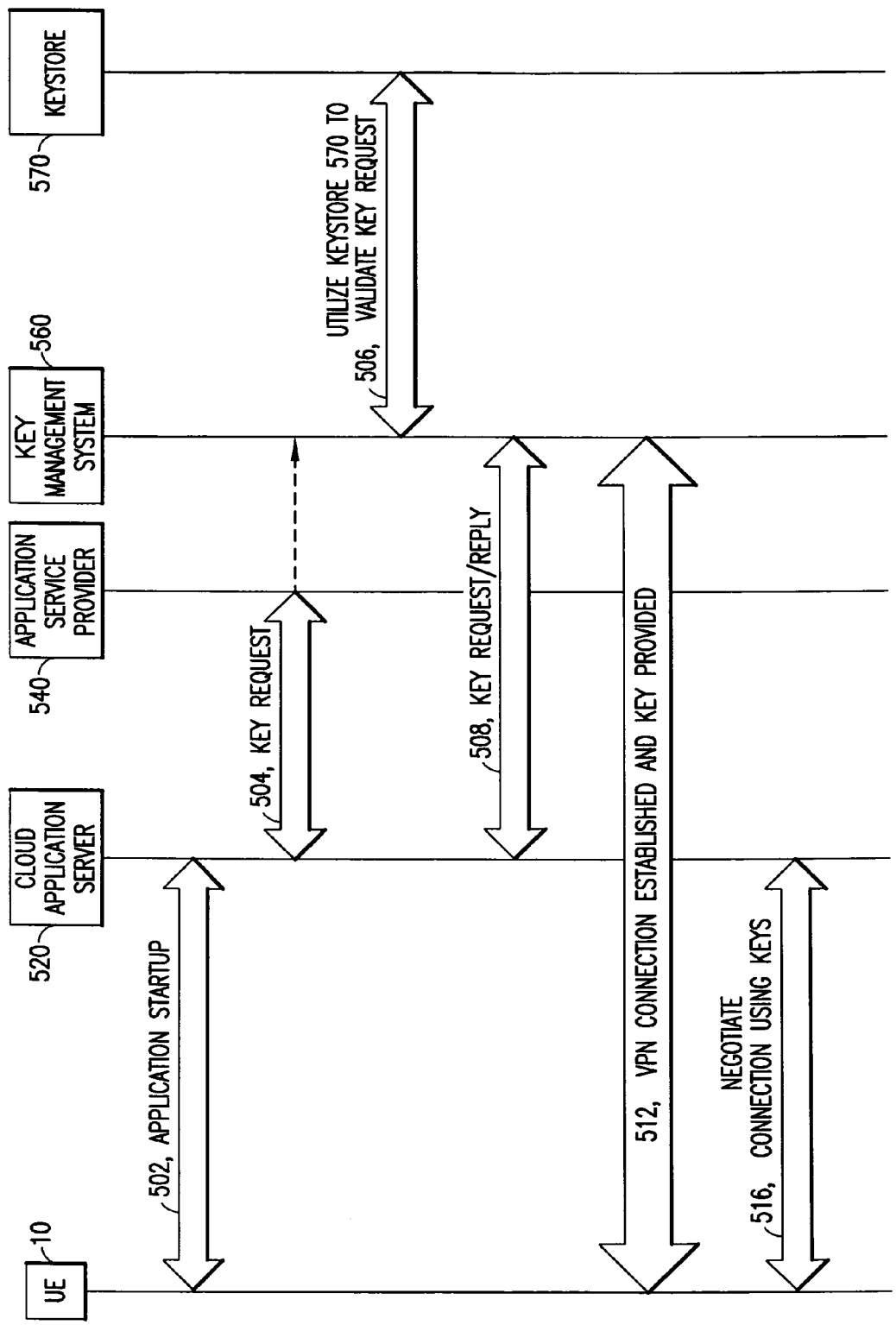

| THREAT AGENT (THREAT) | DESCRIPTION |
|---|---|
| CLOUD PROVIDER (COMPLYING LEGAL REQUEST) | COULD COMPLY WITH A LEGAL REQUEST AND HAND OVER DATA/KEYS/CONFIG /WHATEVER-IT-CAN-GET-HOLD-OF TO LEGAL AUTHORITIES. APPLICATION SERVICE PROVIDER MAY NOT BE NOTIFIED OF THIS, AND THIS LEAKAGE CAN PUT APPLICATION SERVICE PROVIDER IN VIOLATION OF PRIVACY LAWS |
| EXTERNAL ATTACKER (WITH EC2 OS ACCESS) | ATTACKER IS ON THE BOX. WE WANT TO MINIMIZE IMPACT OF MALICIOUS ACCESS |
| EXTERNAL ATTACKER (WITH SQL ACCESS) | ATTACKER USED SQLI AND CAN NOW QUERY DB. OS CMD ACCESS AND FILESYSTEM READ ACCESS WERE NOT POSSIBLE THROUGH THIS PARTICULAR ATTACK |
| EXTERNAL ATTACKER (WITH FILESYSTEM ACCESS) | EITHER THROUGH AN EXPLOIT IN WEB APPLICATION CODE, OR VIA OTHER (BUT NOT THROUGH COMPLETE OS COMPROMISE), THIS ATTACKER CAN READ AND POSSIBLY WRITE) FILES |
| MALICIOUS INSIDER – CLOUD PROVIDER (WITH STORAGE/RUNTIME ACCESS) | SOMEBODY FROM AWS TECHNICAL PERSONAL ACTING AS "MALICIOUS INSIDER" – HAVING ACCESS TO STORAGE AND RUNTIME |
| MALICIOUS INSIDER – APPLICATION SERVICE PROVIDER (WITH EXCESSIVE PRIVILEGES) | A MALICIOUS APPLICATION SERVICE PROVIDER EMPLOYEE, DEVELOPER OR OPS TEAM REPRESENTATIVE (OR WHATEVER DEVOPS) HAVING ACCESS TO PRODUCTION DATA TO WHICH ACCESS SHOULDN'T BE GRANTED |
| CLOUD PROVIDER (ACCIDENTAL DISCLOSURE) | DATA STORED IN CLOUD MAY BE INADVERTENTLY EXPOSED BY THE PROVIDER |
| AWS KMS ACCESS CONTROL | DATA ENCRYPTION KEYS (DEKs) & MASTER KEY (KEKs) IN A KMS DEPLOYED IN CLOUD PROVIDER COULD BE ILLEGALLY ACCESSED BY VARIOUS ENTITIES |

FIG.6

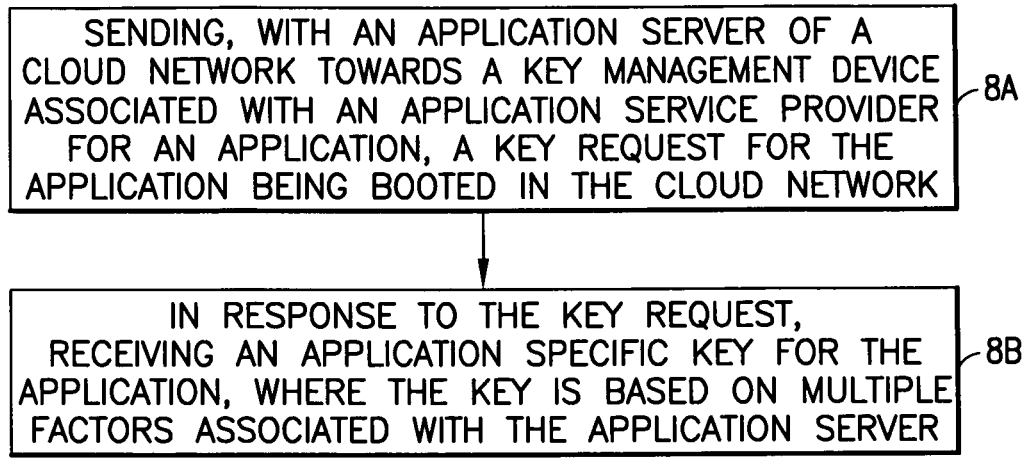

CLOUD CENTRIC APPLICATION TRUST VALIDATION

RELATED APPLICATIONS

This patent application claims priority under 35 U.S.C. §119(e) from Provisional Patent Application No. 61/736,197 filed Dec. 12, 2012 the disclosure of which is incorporated by reference herein in its entirety.

TECHNICAL FIELD

The teachings in accordance with the exemplary embodiments of this invention relate generally to cloud centric application trust validation and, more specifically, relate to multifactor trust validation by an application service provider to authenticate applications running in a cloud network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AES advanced encryption standard
AMI amazon machine image
API application programming interface
AWS application web service
DB database
DC domain controller
EBS elastic block store
ELB elastic load balancer
EMR elastic map reduce
FIDS federal information processing standards
ID identification
HSM hardware security module
KM key management
KMS key management service
RDS rational database service
SDK software development kit
SSL secure sockets layer Cloud computing is an approach to sharing computing resources over the Internet. One area of cloud computing includes a host provider (for example, cloud provider) providing virtual server instances on which user devices can run applications. Examples of applications available in such a cloud environment can include social media applications, and applications provided by Yahoo®, EBay®, and Amazon® to name only a few. As these applications are run in a cloud separate from a user device and its application service provider special attention needs to be given to application data security. In this regard at least a problem exists in that application data security may not be trusted to be provided by the cloud provider.

SUMMARY

In an exemplary aspect of the invention, there is a method comprising: sending, with an application server of a cloud network towards a key management device associated with an application service provider for an application, a key request for the application being booted in the cloud network; and in response to the key request, receiving an application specific key for the application, where the key is based on multiple factors associated with the application server.

In an exemplary aspect of the invention, there is an apparatus comprising: at least one processor; and at least one memory including computer program code, where the at least one memory and the computer program code are configured, with the at least one processor, to cause the apparatus to at least: send, with an application server of a cloud network towards a key management device associated with an application service provider for an application, a key request for the application being booted in the cloud network; and in response to the key request, receive an application specific key for the application, where the key is based on multiple factors associated with the application server.

In another exemplary aspect of the invention, there is an apparatus comprising: means for sending, with an application server of a cloud network towards a key management device associated with an application service provider for an application, a key request for the application being booted in the cloud network; and means, in response to the key request, for receiving an application specific key for the application, where the key is based on multiple factors associated with the application server.

In accordance with the exemplary aspect of the invention as in the paragraph above, the means for sending and the means for receiving comprise an interface to a communication network, and a computer readable memory including computer program code, the computer program code executed by at least one processor.

In another exemplary aspect of the invention, there is a method comprising: receiving, with a key management device associated with an application service provider for an application, a key request from an application server of a cloud network for the application being booted in the cloud network; in response to the key request, authenticating the request using multiple attributes associated with the application server; and sending an application specific key for the application towards the application server.

In still another exemplary aspect of the invention, there is an apparatus comprising: at least one processor; and at least one memory including computer program code, where the at least one memory and the computer program code are configured, with the at least one processor, to cause the apparatus to at least: receive, with a key management device associated with an application service provider for an application, a key request from an application server of a cloud network for the application being booted in the cloud network; in response to the key request, authenticate the request using multiple attributes associated with the application server; and send an application specific key for the application towards the application server.

In yet another exemplary aspect of the invention, there is an apparatus comprising means for receiving, with a key management device associated with an application service provider for an application, a key request from an application server of a cloud network for the application being booted in the cloud network; means, in response to the key request, for authenticating the request using multiple attributes associated with the application server; and means for sending an application specific key for the application towards the application server.

In accordance with the exemplary aspect of the invention as in the paragraph above, the means for receiving, the means for authenticating, and the means for sending comprises an interface to a communication network, and a computer readable memory including computer program code, the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 4 is a block diagram illustrating different modules of a key management system in accordance with the exemplary embodiments;

FIGS. 5A, 5B, and 5C illustrate communication and/or operation architectures in accordance with the exemplary embodiments of the invention;

FIG. 6 illustrates security threats which are mitigated using the exemplary embodiments of the invention;

FIGS. 8 and 9 are each a logic flow diagram that illustrates the operation of a method and a result of execution of computer program instructions embodied on a computer readable medium, in accordance with exemplary embodiments of this invention.

DETAILED DESCRIPTION

The exemplary embodiments of the invention provide at least a method to provide cloud centric trust validation in order to enable a trusted application to get access to encrypted content and encryption key management services.

Figure 1:
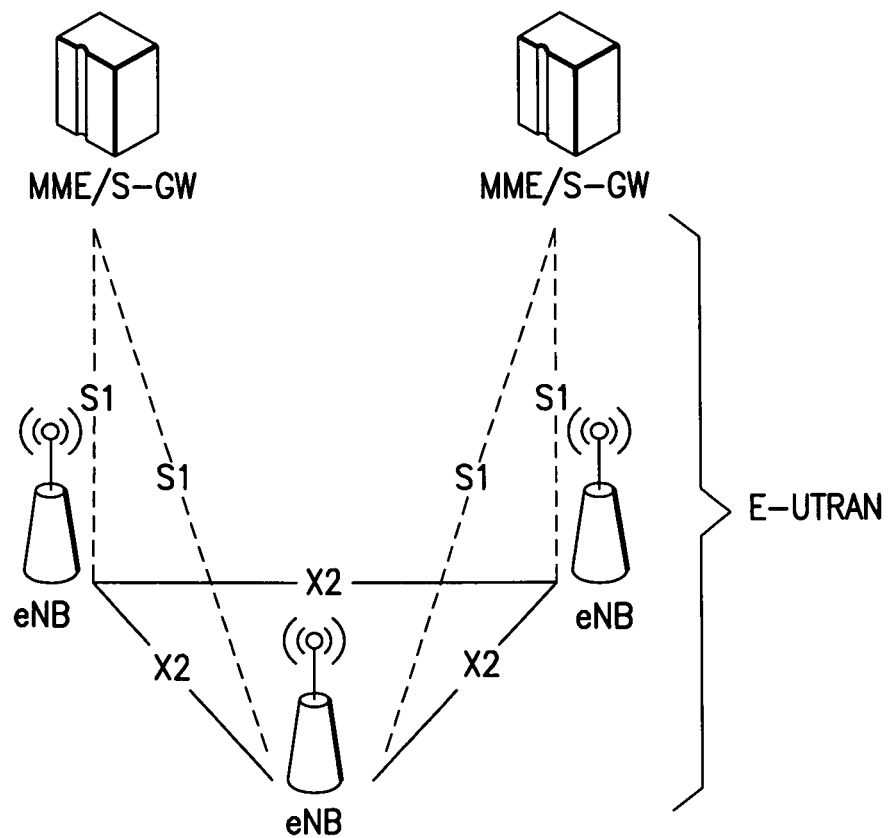
FIG. 1 shows is based on FIG. 4.1 of 3GPP TS 36.300, and shows the overall architecture of the E-UTRAN system.

FIG. 1 is based on FIG. 4.1 of 3GPP TS 36.300 and shows the overall architecture of the E-UTRAN system in which user equipment may be benefited by the exemplary embodiments of the invention. The E-UTRAN system includes network access nodes or eNBs providing the E-UTRAN user plane and control plane (radio resource control (RRC)) protocol terminations towards UEs. The eNBs are interconnected with each other by means of an X2 interface. The eNBs are also connected by means of an S1 interface to an evolved packet core (EPC), and more specifically to a mobility management entity (MME) and to a serving gateway (S-GW) by means of an S1 MME interface. The S1 interface supports a many-to-many relationship between MMEs, S-GWs and eNBs.

Current state of technology depends on encryption operations and key management systems deployed within public cloud environments and/or leveraging trust validation solution that exclusively or significantly depend on validation of applications from within the public cloud. Both of these factors will pose various security and compliance risks to users and other entities.

Although the invention may be described and/or illustrated using references to particular entities such as Nokia® and Amazon® the use of these entities is non-limiting and the invention can be practiced to the benefit of any entities which incorporate similar technology.

In accordance with an exemplary embodiment of the invention which will be described in more detail below there is at least a method to authenticate a trusted application running in a cloud in order to at least ensure that data, such as sensitive data, provided to/from such a cloud centric application is secure.

Figure 2:
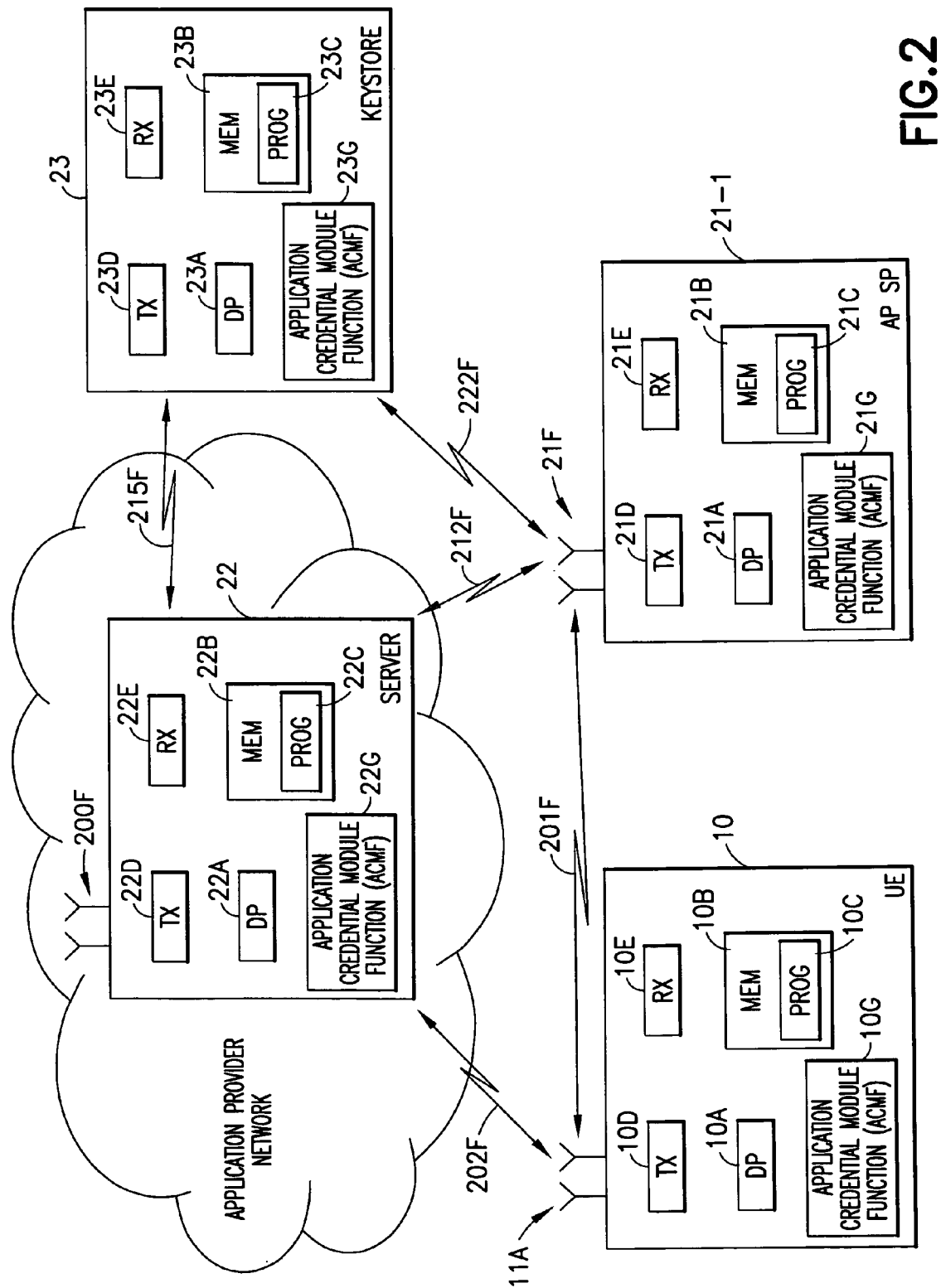
FIG. 2 shows a simplified block diagram of various electronic devices that are suitable for use in practicing the exemplary embodiments of this invention.

Before describing in further detail the exemplary embodiments of this invention reference is made to FIG. 2 for illustrating a simplified block diagram of various electronic devices and apparatus that are suitable for use in practicing the exemplary embodiments of this invention. In FIG. 2 a Server 22, Application provider device (AP) 21, and a keystore device 23 is adapted for communication over a wired and/or wireless link with an apparatus, such as a communication and/or computing device referred to herein as a UE 10. This communication can occur via a network access node, such as a Node B (base station). In addition, the UE 10 can be a mobile device such as a smart phone or a stationary device such as a desktop computer. Further, the UE 10 can be any electronic device which is configured to run such cloud centric applications. Such UE devices can include but is not limited to a laptop, personal data assistant, a GPS, and a mobile phone etc. The Application provider network may include a server 22 that may include the MME/SGW functionality shown in FIG. 1, and which provides connectivity with a farther network, such as a telephone network and/or a data communications network (e.g., the internet).

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the Server 22 and/or another device of the application provider 200 via an antenna or antennas 200F, and/or a hardwired connection.

The server 22 also includes a controller, such as at least one computer or a data processor (DP) 22A, at least one computer-readable memory medium embodied as a memory (MEM) 22B that stores a program of computer instructions (PROG) 22C, and at least one suitable RF transceiver 22D for communication with the UE 10 via antennas 11B (several when MIMO operation is in use). The server 22 is coupled via a data/control path 212F to the AP 21. The path 212F may be implemented as the S1 interface shown in FIG. 1. The server 22 can also be coupled to another device, such as via the data/control path 215F to the keystore 23, which may be implemented as the X2 interface shown in FIG. 1.

For the purposes of describing the exemplary embodiments of this invention the UE 10, the server 22, the application provider device 21, and/or the keystore device 23 may be assumed to include an application credential module function (ACMF). The ACMF 10G, ACMF 21G, ACMF 22G, and/or the ACMF 23G are assumed to be configured to operate in accordance with the non-limiting examples of the embodiments of this invention as described herein.

At least one of the programs 10C, 21C, 22C, and 23C is assumed to include program instructions that, when executed by the associated data processor, enable the device to operate in accordance with the exemplary embodiments of this invention, as will be discussed below in greater detail. That is, the exemplary embodiments of this invention may be implemented at least in part by computer software executable by the DP 10A, DP 21A, DP 22A, and/or DP 23A, or by hardware, or by a combination of software and hardware (and/or firmware). Likewise, the ACMF 10G, ACMF 21G, ACMF 22G, and the ACMF 23G may be implemented at least in part by executable computer software, or by hardware, or by a combination of software and hardware (and firmware).

The various data processors, memories, programs, transceivers and interfaces depicted in FIG. 2 may all be considered to represent various means for performing operations and functions that implement the several non-limiting aspects and embodiments of this invention.

In general, the various embodiments of the UE 10 may include, but are not limited to, cellular mobile devices, personal digital assistants (PDAs) having wireless and/or wired communication capabilities, portable computers having communication capabilities, GPS devices, image capture devices such as digital cameras having communication capabilities, gaming devices having communication capabilities, music storage and playback appliances having communication capabilities, Internet appliances permitting wireless Internet access and browsing, as well as portable units or terminals that incorporate combinations of such functions.

The computer-readable memories 10B, 21B, 22B, and 23B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 21A, 22A, and 23A may be of any type suitable to the local technical environment, and may include one or more of general purpose computers, special purpose computers, microprocessors, digital signal processors (DSPs) and processors based on multi-core processor architectures, as non-limiting examples.

It is noted that any or all of the links 201F, 202F, 212F, 215F, and/or 222F may comprise a hardwired connection of some kind. In addition, the links L302, L364, and/or L306, as will be described below, can be accomplished using these links 201F, 202F, 212F, 215F, and/or 222F as illustrated in FIG. 2.

Application data security in cloud is reliant on application credential and/or key security. Sensitive data associated with an application running in a cloud provider network and/or a public cloud can more easily be compromised. The exemplary embodiments of the invention include a method and apparatus to provide with an application service provider or a third party provider who is separate from the cloud provider, a unique key which can be used by an application server and a user device to authenticate an application, such as an application running in a public cloud. The method in accordance with the exemplary embodiments providing novel authentication means and protection against security threats when running such cloud centric applications, as will be described in more detail below.

Figure 3A:
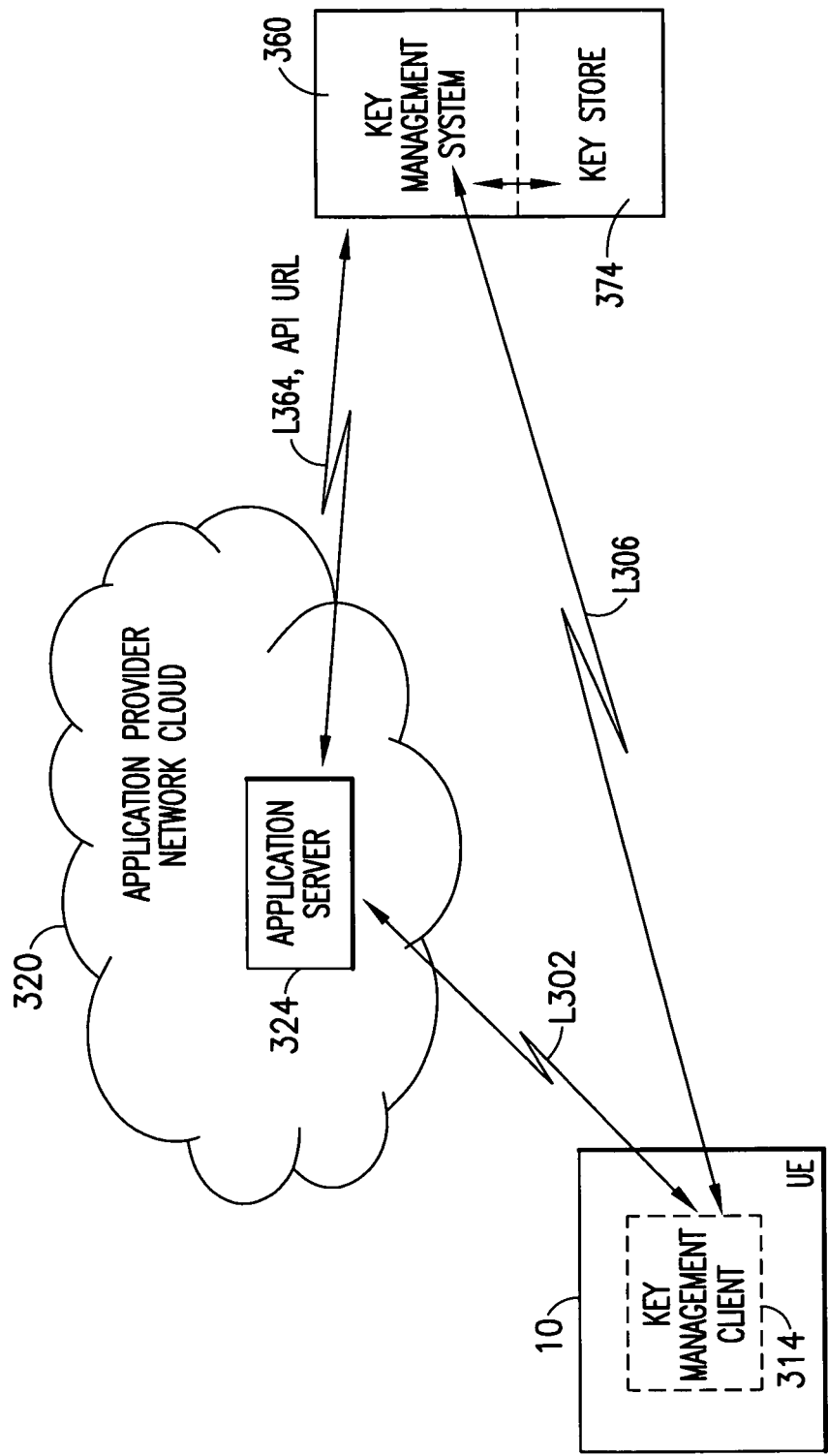
FIGS. 3A and 3B each shows an operation of a cloud application trust validation in accordance with the exemplary embodiments of the invention.
Figure 3B:
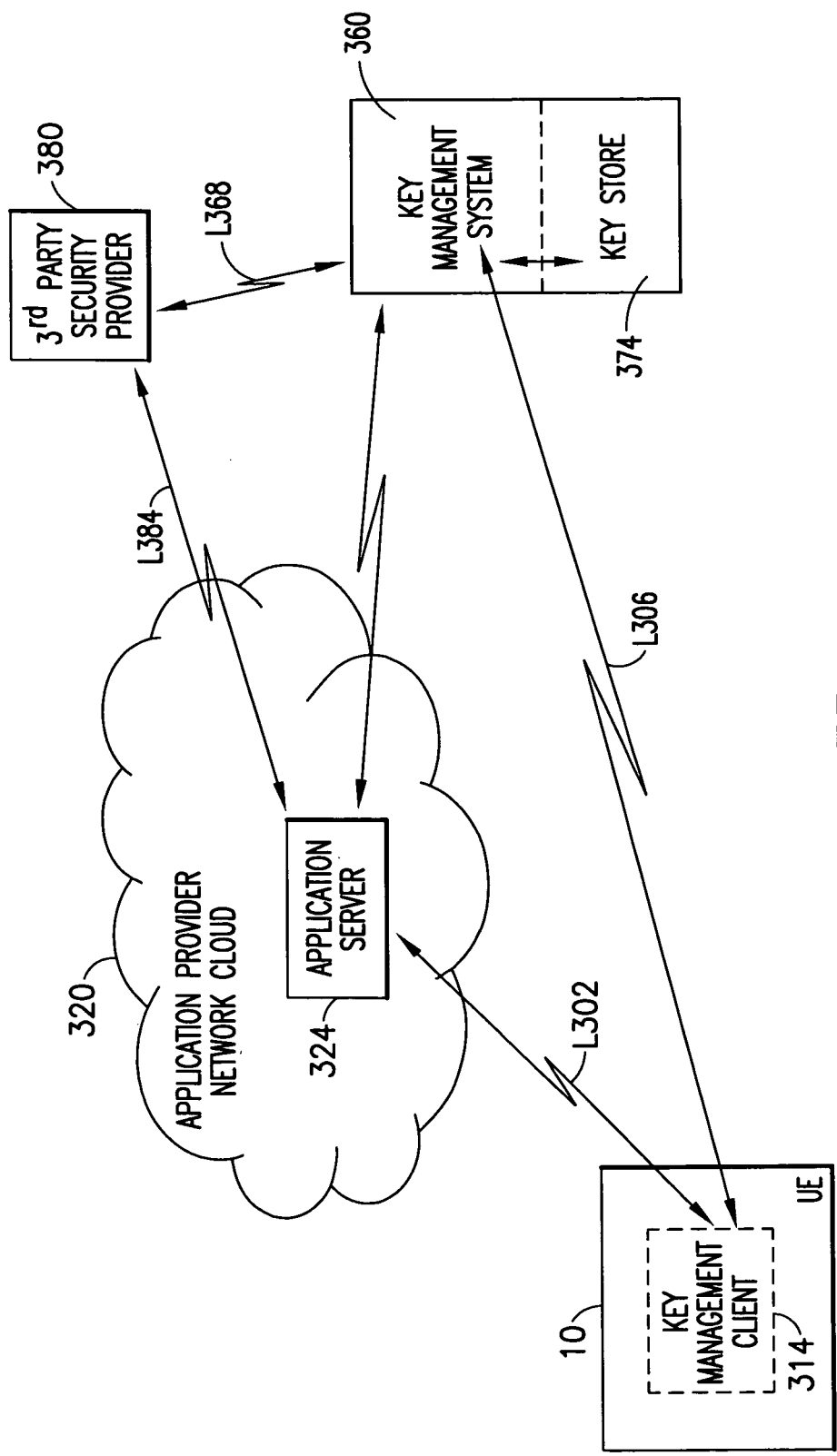

With regards to FIGS. 3A and 3B, operations in accordance with the exemplary embodiments of the invention as illustrated in these Figures are described below:

1) At application start-up/AWS instance boot-up time each application deployed in the application provider network 320 cloud, or a public cloud, will have a communication mechanism such as an S3 API URL configured (in the start-up scripts) which it can use to communicate with the key management server 360 via the link L364. As similarly stated above, any of the links L302, L306, L364, L368, and/or L384 can be a wireless link, a hardwired link, or comprise a combination of both. Further, the described use of the S3 API URL is non-limiting in that at least the key related communications between the application server 324 and the key management system 360 may be initiated using any suitable communication mechanism. Step 1 may be performed using the S3 API URL as stated above, where the URL includes no additional data. In addition, the application startup could provide at boot-up or bootstrap a 16 kbyte secret hardcoded into the boot-up or the bootstrap code. For example, a pseudo script example for a format of the S3 API call at bootstrapping time can be as follows:
   # Authenticate to AWS API using rotating EC2 hypervisor hosted application specific role keys s3=AWS.S3.new( )
   # Retrieve rotating initialization secret from ACL protected S3 object initialization_secret=s3.read(well_known_application_specific_key)
   # Use the initialization secret to establish trust with KSM 2) The S3 API URL will be access controlled for the instance/app such that the application server 324 can retrieve a secret key which will be used as one attribute to validate against the Credential/Key Store. This validation performed to obtain an application specific private key, such as an SSL key, needed to access Key Management Service (KSM) to retrieve data encryption keys and key encryption keys. The S3 API URL can create the link L364, and the application server can retrieve the secret key from the key management system 360 via the link L364, or another link.

3) The S3 API URL will be application specific and be generated at application deployment time together with the unique secret key for the application.

4) The application (KM) credentials (SSL private_key) can be stored in a Credential/Key Store which is in some way exposed to the server 324 in the application provider network cloud 320 cloud. The Credential/KeyStore will expose a RESTful API interface to enable retrieval of the app-specific KM client credential. The scope of this Credential/Key Store will initially be limited to application service provider's application specific authentication credentials.

5) At bootstrapping time the App would need to invoke the Credential/KeyStore GetKMSClientCredential REST API deployed in the cloud provider environment with following multi-factor attributes (1) (AppID, SOURCE IP ADDRESS, +other AWS instance data (AWSID) (2) Secret Key from Step #1. A reverse-lookup/query call to an AWS API will need to be made to validate the source IP address (+any other AWS instance data) of the calling client where the instance bootstrapping is taking place to confirm that the source IP Address is associated to a cloud provider account assigned to the application service provider.

6) The KeyStore 23 will validate that the request is coming from an authorized, application service provider application using the required and optional attributes specified in #4 above.

7) The calling client application will be returned its app-specific SSL priv_key, and the client application will use that to initialize the KM client for any subsequent requests to Key Management Service accessible directly in cloud provider AWS cloud and/or via an application service provider data center deployed KMS.

For initialization of a secret at Bootstrapping time, when new instance is created, e.g. using Auto Scaling or EMR API there has to be some kind of token that is used (together with other methods, like EC2 API calls) to establish the trust between the new instance and KMS. In other words a "traditional" way of establishing that trust manually by typing a PIN on console or using key on USB key etc. won't work in cloud where instances are created as a result of REST API calls to AWS or increasing load.

In other words the "traditional" way of establishing that trust manually by typing a PIN on console or using key on USB key etc. won't work in cloud where instances are created as a result of REST API calls to AWS or increasing load. An automated way of application validation at bootstrapping time is needed which would be prevention mechanism to deter internal and external attackers to make it difficult to exploit the pre-bootstrapping step for the application. After the pre-bootstrapping step triggered via script is completed via the S3 API call to a app specific URL, a second level of authentication will be carried out by the GetKMSClientCredential REST API exposed by KeyStore server running in the public cloud environment. The successful invocation of this multi-factor authenticated API call will allow the application running on that AMI to retrieve the required credentials which can be subsequently be used to retrieve app specific encryption keys. The initialization steps combined with MFA that includes an encrypted AppID will help deter attackers.

It is expected that most or all of the above pre-bootstrapping and bootstrapping steps, including invocation of the app specific S3 API call and invocation of KeyStore REST API from the server instance running in the public cloud will be automated. A good analogy for this process is the automatic scaling group (in public cloud infrastructure) that adds and removes instances based on the CPU load as an example.

FIG. 4 illustrates operations which are supported in accordance with the exemplary embodiments of the invention by modules of the key management system. The key management system module can perform operations including:

Centralized Key Management System that supports via HSM ability to securely store, manage, access data encryption keys and master keys Key algorithm support to include all standards: AES Symmetric Keys, RSA/DSA Public Key Encryption, etc.

Module 1 (M1) Full Key Management Life-Cycle support capability to create keys capability to Update/rotate keys key rotation can use rotation policies on a per-application basis capability to revoke keys capability to delete keys support for key rotation based on rotation policies on per-application basis allowing via a management interface on a per-application basis policy definition for complete key lifecycle management such that application provider can locally enforce a broad range of policies for authorizations, rotations, groupings, expirations, revocations, retrieval limits, etc. to comply with business policies and various regional compliance requirements.

enable admins to set policies for accessing keys, and supports complete audit trail of key accesses initiated by server admins as well all critical key assets accessed by calling client applications.

support multi-site DR/HA, high performance and scalability requirements for concurrent, multi-region/distributed client access support hot swappable auto clustering key management servers, (e.g., active-active deployment of KM/HSM).

support for Linux system (CentOS, Redhat)

support hardware based deployment on any standard commodity server

FIPS 2/3 compliance

KIPS v1 protocol support

Propogate critical alerts support multi-language integration support via REST API interface and binding client SDKs (minimal: Java, C, C++, C#, PHP, Python).

Technical requirements and pre-conditions include that the RSA KM client supports authentication mechanism that is mutually-authenticated SSL. Each KM enabled application that is allowed to call the KM client must be given a SSL certificate. This certificate will map to an identity on the RSA KM server, which has policies and access rights tied to it (e.g. what keys can it access, what operations can it perform, etc.).

In addition, a REST API interface is provided which will be used to create additional, new clients that support the basic key management interfaces (enabling secure authenticated access to data encryption and master keys). All SDK should be FIPS 1 compliant.

Key Management Client SDK that support client run-time cryptographic processors shall always secure any data encryption keys as encrypted data encryption keys in the run-time memory cache. Furthermore, data encryption and master key(s) accessible via the client SDK run-time will only be in clear text at the time of cryptographic operations needed to carry out encryption or decryption of data and encryption keys respectively Communication between the client application (for example these may or may not use the client SDK, i.e., in some cases use the REST API) running in the public cloud (AWS) and the Key Management Server (deployed in Nokia Data Center) needs to be over a secure and authenticated channel, i.e., access to KMS will be restricted to authorized and application service provider owned applications from AWS via trust validation in the AWS public cloud.

In accordance with the exemplary embodiments of the invention, access to encrypted content and data/key encryption keys available in public cloud and/or in an application service provider private cloud will be restricted to only authorized and trusted applications owned by the application service provider running in AWS public cloud environment. This requires multi-factor authentication consisting of at least 1 or more attributes assigned to application service provider application deployed in AWS together 1 or more attributes from the AWS Cloud/Instance environments. These attributes need to be validated inside AWS environment before getting access to KM Client's SSL private key which will be used to authenticate securely with the application service provider KM.

In accordance with the exemplary embodiments use case specific requirement classifications includes:

Encrypting Data in S3;

Encrypting Data in EBS;

Encrypting Data in AMI;

Encrypting Data in SimpleDB and DynamoDB;

Encrypting Data in Memcached or Amazon ElastiCache;

Encrypting Data in Custom Data Storage (MySQL/Postgresql/MongoDB/CouchDB/Cassandra);

Encrypting Data in CloudFront;

Encryption of Data in RDS MySQL;

Data encryption on all Hadoop data nodes;

Volume level encryption;

Ensure data is secure by encrypting the data volumes on the data node; and/or

EMR nodes

The exemplary embodiments of the invention provide at least a method using a centralized key management system that supports via HSM ability to securely store, manage, access data encryption keys and master keys.

FIG. 5A illustrates an operation of the method in accordance with the exemplary embodiments. At step 502 the UE 10 bootstraps an application of the client application server 520. The application server 520 can be the server 22 as in FIG. 2. At step 504 the cloud application server 520 sends a key request towards the key management system 560 associated with the application service. As illustrated with the dashed line between the Application service provider 540 and the key management system 560 this may not be sent directly but rather be routed towards the key management system 560. The key management system 560 then utilizes the keystore 570 to validate the key request as described above in 6). As shown in steps 508 and 512 a key is returned to the cloud application server and the UE 10, respectively. The communication between the key management system 560 and the UE 10 can be encrypted. Then at step 516 the UE 10 and the client application server authenticate and secure data communicated with the application running on the cloud application server 520. The client-side KeyManager component would be integrated with calling client apps that are deployed in public cloud (AWS) such that the cloud based app will retain decryption keys only in memory and never store in clear-text in AWS run-time. The KM client will be exposed via SDK API interface (e.g., Java, C#, C++, C, PHP, Python, other OS specific shell scripts) and/or REST APIs exposed directly by a Key Manager Service (KMS).

Figure 5B:
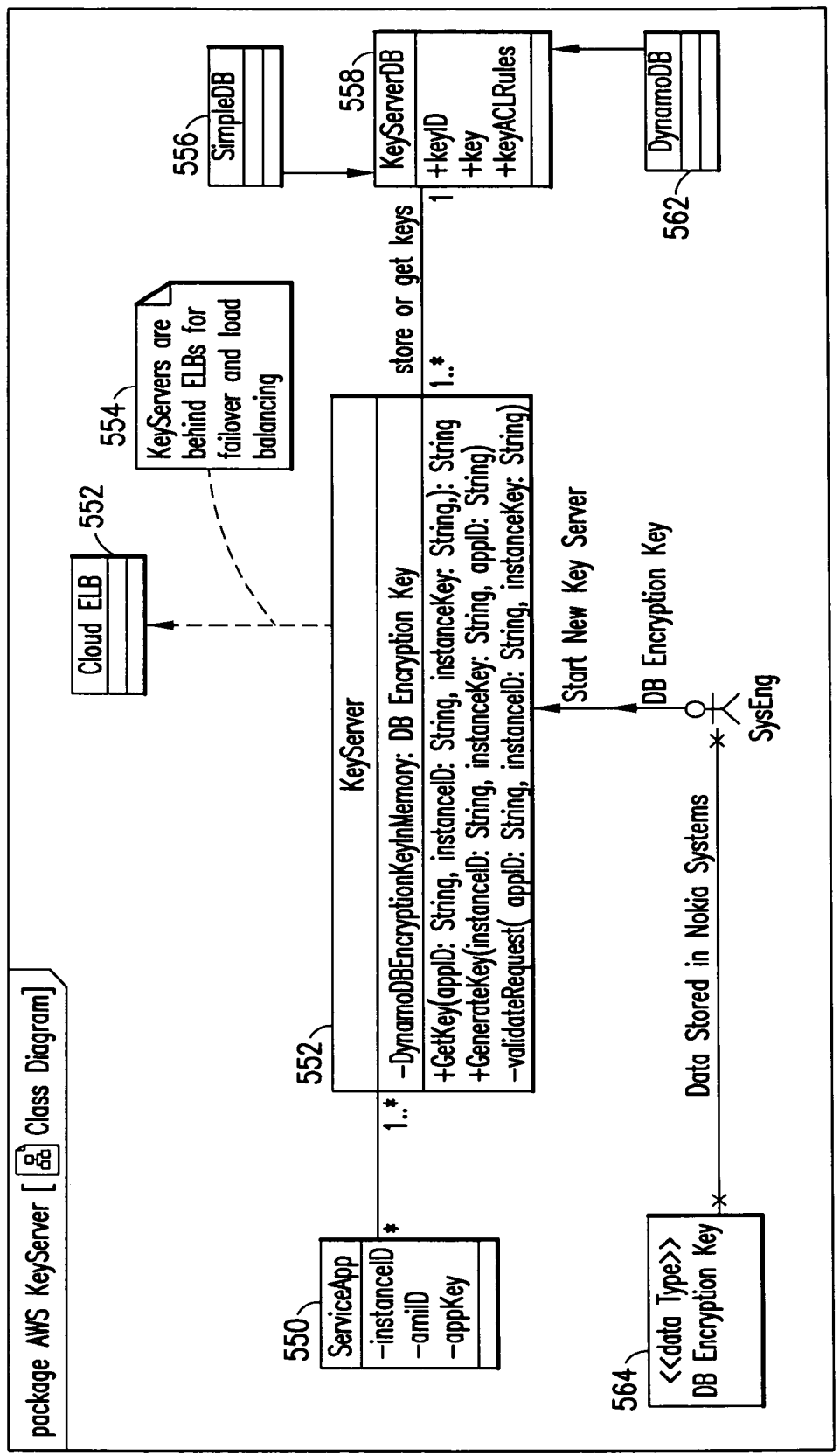

FIG. 5B illustrates public cloud integration architecture with key management services using a key management (KM) client in accordance with the exemplary embodiments. The KeyManager is not a separate service that is common for different services. Instead, it is a component that can be deployed and maintained by individual services. As illustrated in FIG. 5B, the KeyManager implementation includes an encrypted DynamoDB data base associated with a KeyServerDB 558 that is storing Master Keys, Access Control List for authorizing key access, Key IDs and activity logs. The Key Password is used to protect the contents of this DynamoDB. This is similar to the guidance provided at key storage & management. Multiple KeyServer instances running in different regions provide failover. The KeyServer 552 instances must be started manually and the Key Password must be supplied manually during startup. Systems engineering or operations teams could do this. The Key Password must not be stored within AWS. Multiple KeyServer instances are started in different regions so that manual intervention is not needed when any region fails. The KeyServer keeps the Key Password in memory and uses that to decrypt DynamoDB contents, and only HTTPS connections are supported. The KeyServerDB 558 can also be coupled to other database systems of the cloud provider such as the SimpleDB 556 and/or the DynamoDB 562.

As illustrated in FIG. 5B a provider ELB 552 is used for load balancing and failover. As illustrated at 554 of FIG. 5B the KeyServers are positioned behind the ELB for the load balancing and failover. Application servers will connect to KeyServers to obtain a master key. The servers use the Master Key to encrypt their own data. The service application 550 sends a key request which includes authentication information such as Instance ID, AMI ID, IP, etc. KeyServer 552 uses the key ACLs in its DB to verify access. Applications on newly started Amazon instances can request the data encryption key. The KeyManager will authenticate the request using ACLs and return the key. All communication happens via SSL. Applications should receive the key during startup and can cache the received key in memory for performance. Applications like PHP should utilize a local memory cache (Memcach) to cache the key. Ensure strict ACLs on Memcached. Memcached should be bound only to the localhost and/or the AMI instance security group should not allow ingress packages to Memcached port. [#TODO #ISPOSSIBLE? Passing keys as variables to mod_php via Apache]. Applications should still handle master key changes. The KeyManager supports storing multiple Master Keys, generating new ones, and deleting old keys. The KeyManagers do not enforce any key changes.

Figure 5C:
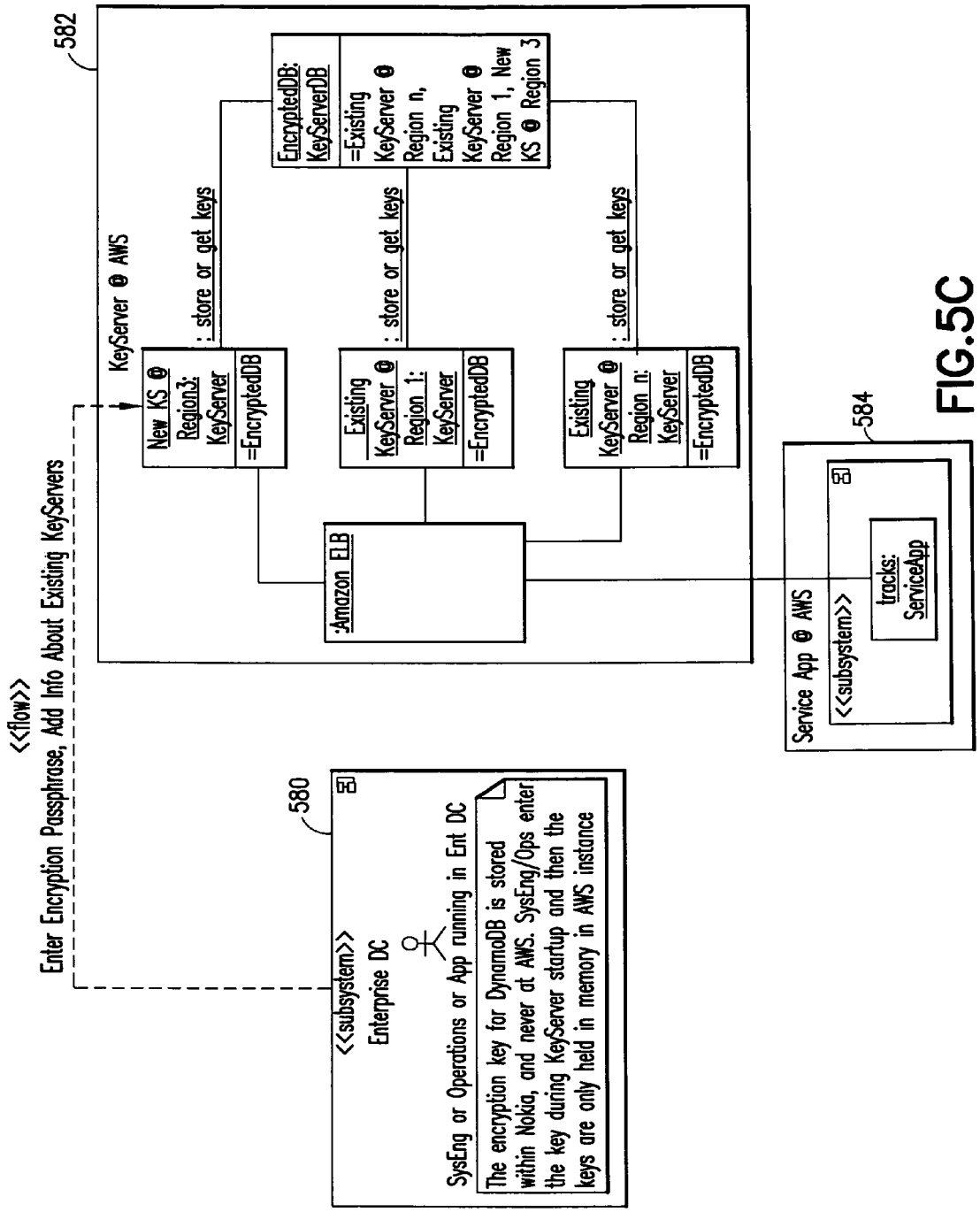

FIG. 5C illustrates a sequence diagram for starting a new KeyServer in accordance with the exemplary embodiments of the invention. With regards to FIG. 5C, as stated above, the reference to entities such as Nokia® and Amazon® is non-limiting and the invention can be practiced to the benefit of any entities which incorporate similar technology. In accordance with an embodiment of the invention, an enterprise domain controller, in this case Nokia DC 580, the encryption key for a DynamicDB is stored within Nokia and not at the cloud provider, in this case Amazon®. The SysEng/Ops enter the key during KeyServer startup, and then the keys are only held in memory in AWS instance. In accordance with an exemplary embodiment of the invention communication between the DC 580 and the KeyServer can include a passphrase entry and/or information about existing KeyServers. As shown in the KeyServer 582 there is load balancing between the existing and new KeyServers. In accordance with the exemplary embodiments certain ones of these KeyServers may be used based on a region and/or subscription of the client device. As shown in FIG. 5C the EncryptedDB:KeyServerDB use the existing KeyServer at region 1 and the new KeyServer at region 3. Further, as shown in FIG. 5C a service App 584 performs a tracking function.

FIG. 6 illustrates some threats which a practice of the exemplary embodiments of the invention can mitigate. These threats include external attacker threats, malicious insider cloud provider threats, malicious insider application service provider threats, and cloud provider accidental disclosure threats.

Figure 7A:
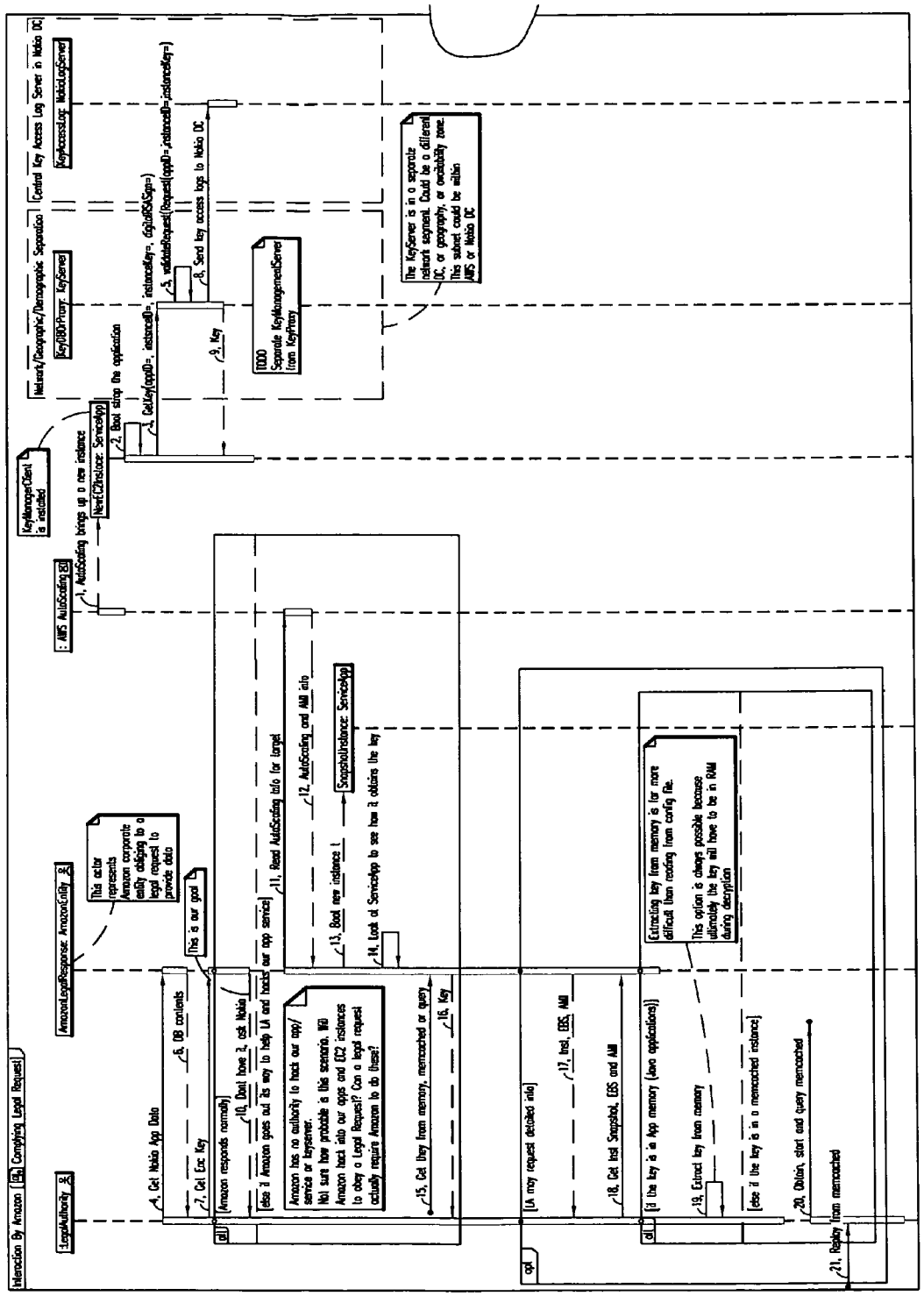
FIGS. 7A, 7B, 7C, and 7D each illustrate aspects of internal security issues addressed using the exemplary embodiments of the invention.
Figure 7B:
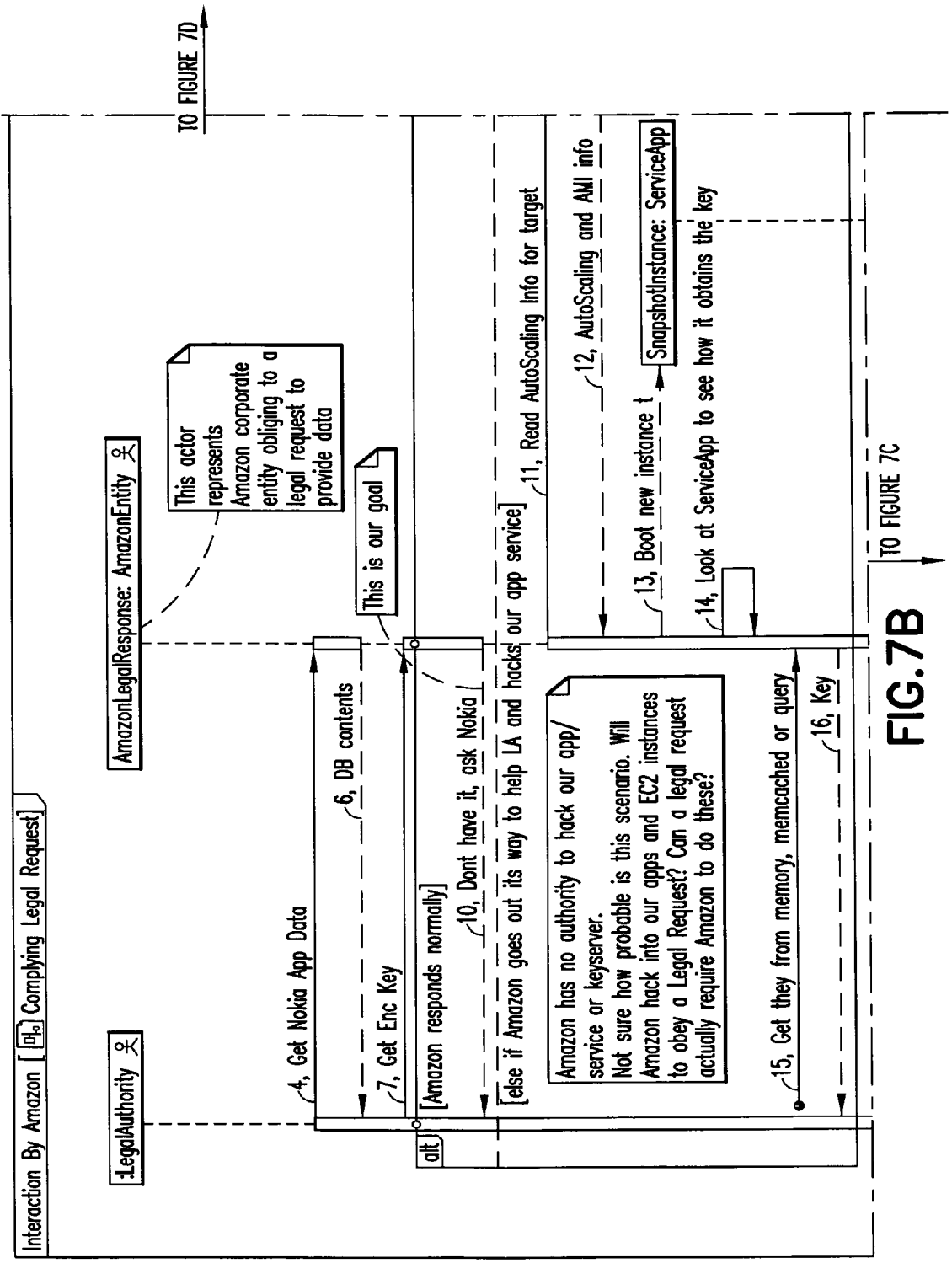
Figure 7C:
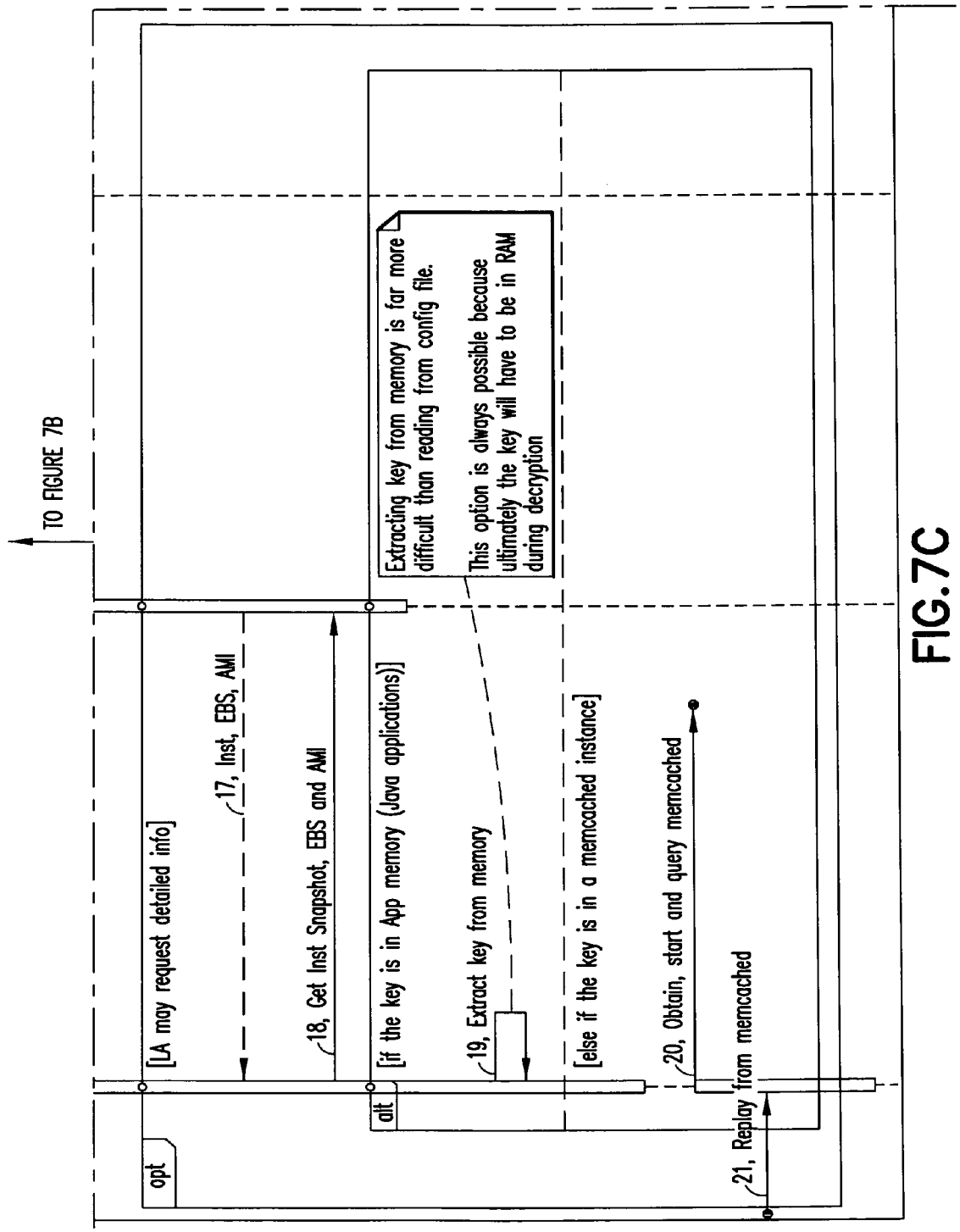
Figure 7D:
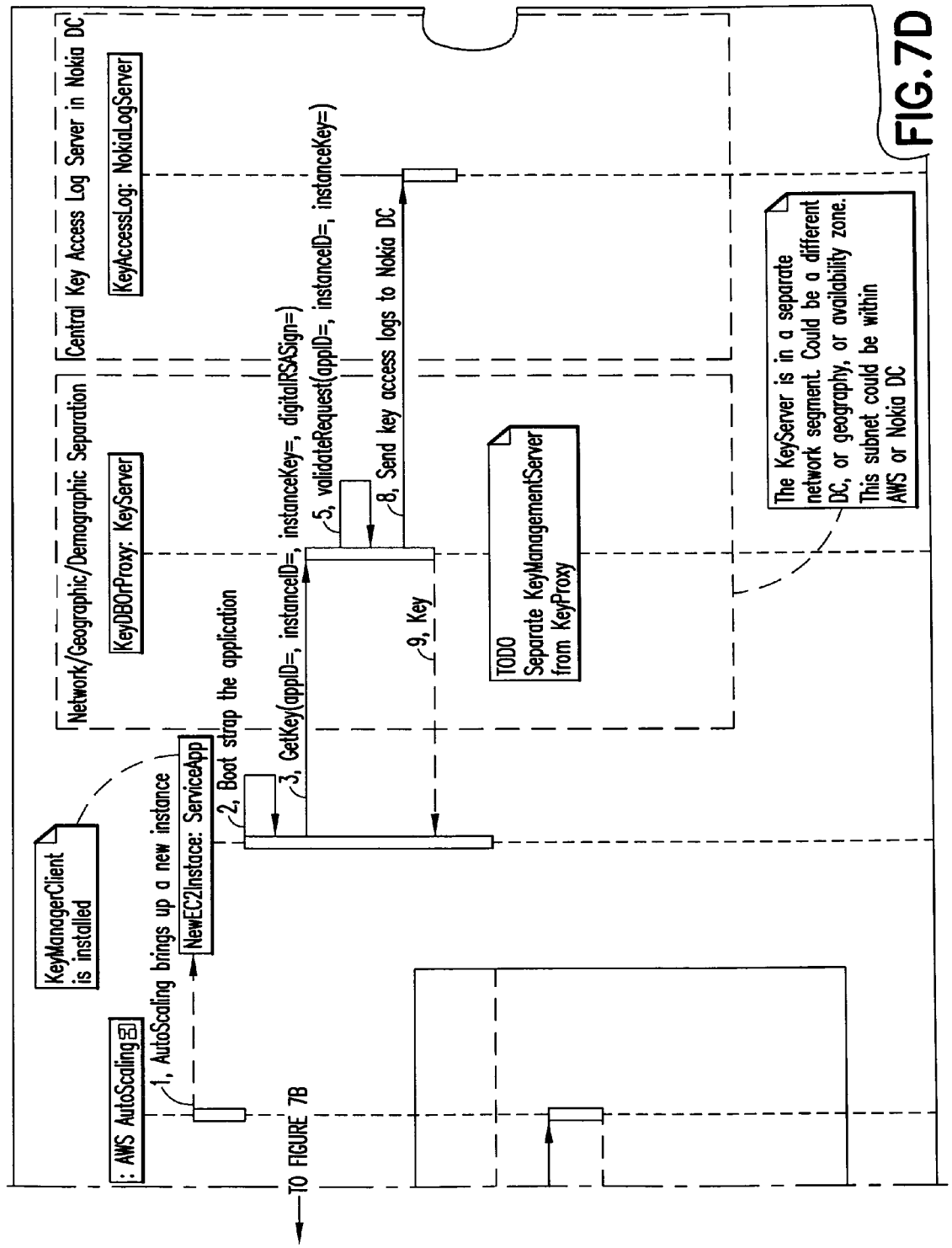

FIGS. 7A, 7B, 7C, and 7D illustrate AWS a production misuse/internal security map. FIG. 7A illustrates a complete picture describing interactions between a cloud application provider, in this case Amazon®, and a legal authority. FIGS. 7B, 7C, and 7D zoom in on various areas of the map as well as comments regarding issues associated with this interaction which the exemplary embodiments of the invention can address.

FIGS. 8 and 9 each illustrate a logic flow diagram that illustrates a non-limiting operation of a method, and a result of execution of computer program instructions, in accordance with exemplary embodiments of this invention.

In accordance with these exemplary embodiments as illustrated in FIG. 8 a method performs, at Block 8A, a step of sending, with an application server of a cloud network towards a key management device associated with an application service provider for an application, a key request for the application being booted in the cloud network. At Block 8B there is a step of in response to the key request, receiving an application specific key for the application, where the key is based on multiple factors associated with the application server.

The method as in FIG. 8, where sending the key request comprises accessing an application programming interface uniform resource locator associated with the key management device.

The method as in the paragraphs above, where the uniform resource locator is initiated in a start-up script of the application.

The method as in the paragraphs above, where the uniform resource locator is initiated without additional data.

The method as in the paragraphs above, where the key request comprises a 16 kb secret key hardcoded into the boot-up or the bootstrap code.

The method as in FIG. 8, further comprising invoking a GetKMSClientCredential REST API deployed in the cloud with multi-factor attributes and the key.

The method as in the paragraphs above, where the multi-factor attributes comprise an identification of the application and an internet protocol address of the application server.

The exemplary embodiments of this invention also provide an apparatus that comprises a processor and a memory including computer program code, where the memory and computer program code are configured to, with the processor, cause the apparatus at least to perform sending, with an application server of a cloud network towards a key management device associated with an application service provider for an application, a key request for the application being booted in the cloud network. Further, to cause the apparatus, in response to the key request, to perform receiving an application specific key for the application, where the key is based on multiple factors associated with the application server.

The exemplary embodiments of this invention also provide an apparatus that comprises means for receiving a request for access at trusted software of a mobile device from an entity of the mobile device; means for sending, with an application server of a cloud network towards a key management device associated with an application service provider for an application, a key request for the application being booted in the cloud network. Further, means, in response to the key request, for receiving an application specific key for the application, where the key is based on multiple factors associated with the application server.

In accordance with these exemplary embodiments as illustrated in FIG. 9 a method performs, at Block 9A, a step of receiving, with a key management device associated with an application service provider for an application, a key request from an application server of a cloud network for the application being booted in the cloud network. At Block 9B there is a step of in response to the key request, authenticating the request using multiple attributes associated with the application server. Then in Block 9C there is a step of sending an application specific key for the application towards the application server.

The method as in FIG. 9, where the request comprises an application programming interface uniform resource locator initiated with the key management device.

The method as in the paragraphs above, where the uniform resource locator is initiated in a start-up script of the application.

The method as in the paragraphs above, where the uniform resource locator is without additional data.

The method as in FIG. 9, where the key request comprises a 16 kb secret key originating from boot-up or bootstrap code associated with the application.

The method as in FIG. 9, where the multi-factor attributes comprise an identification of the application and an internet protocol address of the application server.

The exemplary embodiments of this invention also provide an apparatus that comprises a processor and a memory including computer program code, where the memory and computer program code are configured to, with the processor, cause the apparatus at least to perform receiving, with a key management device associated with an application service provider for an application, a key request from an application server of a cloud network for the application being booted in the cloud network. Further, to cause the apparatus in response to the key request, to perform authenticating the request using multiple attributes associated with the application server. In addition, to cause the apparatus to perform sending an application specific key for the application towards the application server.

The exemplary embodiments of this invention also provide an apparatus that comprises means for receiving, with a key management device associated with an application service provider for an application, a key request from an application server of a cloud network for the application being booted in the cloud network. Further, means, in response to the key request, for authenticating the request using multiple attributes associated with the application server. In addition, means for perform sending an application specific key for the application towards the application server.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
sending, by an application server of a cloud network towards a key management device associated with an application service provider for an application, a key request for the application being booted in the cloud network, wherein sending the key request comprises sending a secret key to the key management device using a uniform resource locator of the key management device, wherein the uniform resource locator is initiated in a start-up script associated with boot-up or bootstrap code of the application being booted in the cloud, and wherein the uniform resource locator is access controlled for the application;
in response to the key request, receiving, by the application server, an application specific key for the application;
using the application specific key, invoking, by the application server, an application program interface to the key management device, wherein the application interface is invoked with multi-factor attributes comprising the application specific key, and an application identification and a source internet protocol address hardcoded into the boot-up or bootstrap code of the application; and
based at least on the multi-factor attributes being validated by the key management device, retrieving, by the application server, encryption keys specific to the application, wherein the encryption keys are used to secure communications between the application and a user of the application.

2. The method of claim 1, wherein the uniform resource locator is initiated without additional data.

3. The method of claim 1, wherein the secret key is a 16 kb secret key hardcoded into the boot-up or bootstrap code of the application being booted in the cloud network.

4. The method of claim 1, wherein the application program interface is a GetKMSClientCredential REST API deployed in the cloud.

5. The method of claim 1, wherein the validating is using a reverse-lookup query to the application program interface confirming that at least the source internet protocol address is associated with a cloud provider account assigned to the application service provider.

6. The method as in claim 1 performed with a non-transitory computer readable medium encoded with a computer program executed by a processor.

7. An apparatus comprising:
  at least one processor; and
  at least one memory including computer program code, where the at least one memory and the computer program code are configured, with the at least one processor, to cause the apparatus to at least:
  send, with an application server of a cloud network towards a key management device associated with an application service provider for an application, a key request for the application being booted in the cloud network, wherein sending the key request comprises sending a secret key to the key management device using a uniform resource locator of the key management device, wherein the uniform resource locator is initiated in a start-up script associated with boot-up or bootstrap code of the application being booted in the cloud, and wherein the uniform resource locator is access controlled for the application;
  in response to the key request, receive an application specific key for the application;
  using the application specific key, invoke an application program interface to the key management device, wherein the application program interface is invoked with multi-factor attributes comprising the application specific key, and an application identification and a source internet protocol address hardcoded into the boot-up or bootstrap code of the application; and
  based at least on the multi-factor attributes being validated by the key management device, retrieve encryption keys specific to the application, wherein the encryption keys are used to secure communications between the application and a user of the application.

8. The apparatus of claim 7, wherein the uniform resource locator is initiated without additional data.

9. The apparatus of claim 7, wherein the secret key is a 16 kilobyte secret key hardcoded into the boot-up or bootstrap code of the application being booted in the cloud network.

10. The apparatus of claim 7, wherein the application program interface is a GetKMSClientCredential REST API deployed in the cloud.

11. The apparatus of claim 10, wherein the validating is using a reverse-lookup query to the application program interface confirming that at least the source internet protocol address is associated with a cloud provider account assigned to the application service provider.

12. A method comprising:
  receiving, by a key management device associated with an application service provider for an application, a key request from an application server of a cloud network for the application being booted in the cloud network, wherein the key request comprises a secret key of the application, wherein the key request is using a uniform resource locator of the key management device initiated in a start-up script associated with boot-up or bootstrap code of the application being booted in the cloud, and wherein the uniform resource locator is access controlled for the application;
  in response to the key request sending, by the key management device, an application specific key for the application towards the application server;
  in response to the sending, receiving, by the key management device, an application program interface invoked with multi-factor attributes comprising the application specific key, and an application identification and a source internet protocol address hardcoded into the boot-up or bootstrap code of the application; and
  based at least on the multi-factor attributes being validated by the key management device, providing, by the key management device, encryption keys specific to the application, wherein the encryption keys are used to secure communications between the application and a user of the application.

13. The method of claim 12, wherein the uniform resource locator is initiated without additional data.

14. The method of claim 12, wherein the secret key is a 16 kilobyte key originating from the boot-up or bootstrap code of the application being booted in the cloud network.

15. The method of claim 12, wherein the application program interface is a GetKMSClientCredential REST API deployed in the cloud with the multi-factor attributes.

16. The method as in claim 12 performed with a non-transitory computer readable medium encoded with a computer program executed by a processor.

17. An apparatus comprising:
  at least one processor; and
  at least one memory including computer program code, where the at least one memory and the computer program code are configured, with the at least one processor, to cause the apparatus to at least:
  receive, with a key management device associated with an application service provider for an application, a key request from an application server of a cloud network for an application being booted in the cloud network, wherein the key request comprises a secret key of the application, wherein the key request is using a uniform resource locator of the key management device initiated in a start-up script associated with boot-up or bootstrap code of the application being booted in the cloud, and wherein the uniform resource locator is access controlled for the application;
  in response to the key request, send an application specific key for the application towards the application server;
  in response to the sending, receive an application program interface invoked with multi-factor attributes comprising the application specific key, and an application identification and a source internet protocol address hardcoded into the boot-up or bootstrap code of the application; and
  based at least on the multi-factor attributes being validated, provide encryption keys specific to the application, wherein the encryption keys are used to secure communications between the application and a user of the application.

18. The apparatus of claim 17, wherein the uniform resource locator is initiated without additional data.

19. The apparatus of claim 17, wherein the secret key is a 16 kb secret key originating from the boot-up or bootstrap code associated with the application being booted in the cloud network.

20. The apparatus of claim 17, wherein the application program interface is a GetKMSClientCredential REST API deployed in the cloud.

\* \* \* \* \*